(12) United States Patent
Nguyen et al.

(10) Patent No.: US 7,794,813 B2
(45) Date of Patent: Sep. 14, 2010

(54) TUBULAR COMPOSITE STRUCTURES

(75) Inventors: Huy X. Nguyen, Midlothian, VA (US);
Elizabeth S. Parrish, Blackstone, VA (US); John E. Holland, Bailey, NC (US)

(73) Assignee: Honeywell International Inc., Morristown, NJ (US)

( * ) Notice: Subject to any disclaimer, the term of this patent is extended or adjusted under 35 U.S.C. 154(b) by 885 days.

(21) Appl. No.: 11/638,284

(22) Filed: Dec. 13, 2006

(65) Prior Publication Data

US 2008/0145579 A1 Jun. 19, 2008

(51) Int. Cl.
*B32B 3/00* (2006.01)
(52) U.S. Cl. .................................................. 428/60
(58) Field of Classification Search ............... 428/34.1, 428/3.1, 34.5, 35.7, 35.9, 36.3, 53, 60; 442/182, 442/188, 218, 220, 399
See application file for complete search history.

(56) References Cited

U.S. PATENT DOCUMENTS

| | | | | |
|---|---|---|---|---|
| 3,671,542 A | 6/1972 | Kwolek et al. | ............... | 524/157 |
| 3,975,487 A | 8/1976 | Cottis et al. | ............... | 264/210.6 |
| 4,118,372 A | 10/1978 | Schaefen | ............... | 528/190 |
| 4,137,394 A | 1/1979 | Meihuizen et al. | .......... | 528/100 |
| 4,161,470 A | 7/1979 | Calundann | ................... | 524/599 |
| 4,356,138 A | 10/1982 | Kavesh et al. | ............... | 264/164 |
| 4,413,110 A | 11/1983 | Kavesh et al. | ............. | 526/348.1 |
| 4,440,711 A | 4/1984 | Kwon et al. | ............... | 264/185 |
| 4,457,985 A | 7/1984 | Harpell et al. | ............... | 428/224 |
| 4,535,027 A | 8/1985 | Kobashi et al. | ............. | 428/364 |
| 4,599,267 A | 7/1986 | Kwon et al. | ................. | 428/364 |
| 5,286,833 A | 2/1994 | Bubeck et al. | ............... | 528/183 |
| 5,296,185 A | 3/1994 | Chau et al. | ................... | 264/205 |
| 5,356,584 A | 10/1994 | Bubeck et al. | ............... | 264/205 |
| 5,534,205 A | 7/1996 | Faley et al. | .................. | 264/103 |
| 5,674,969 A | 10/1997 | Sikkema et al. | .............. | 528/183 |
| 5,702,657 A | 12/1997 | Yoshida et al. | .............. | 264/112 |
| 5,939,553 A | 8/1999 | Reichwein et al. | .......... | 546/250 |
| 5,945,537 A | 8/1999 | Sikkema | ...................... | 546/307 |
| 6,040,050 A | 3/2000 | Kitagawa et al. | ............ | 428/364 |
| 6,040,478 A | 3/2000 | Sikkema et al. | ............. | 562/424 |
| 6,280,546 B1 | 8/2001 | Holland et al. | ................ | 156/85 |
| 6,390,141 B1 * | 5/2002 | Fisher et al. | ................. | 138/137 |
| 6,708,729 B1 | 3/2004 | Smith | .......................... | 138/98 |
| 2004/0154847 A1 | 8/2004 | Holland et al. | .............. | 180/127 |
| 2005/0176320 A1 | 8/2005 | Holland et al. | ................ | 442/59 |

FOREIGN PATENT DOCUMENTS

| | | |
|---|---|---|
| DE | 2855694 | 7/1980 |
| EP | 0999394 | 5/2000 |
| EP | 1108528 | 6/2001 |
| EP | 1221567 | 7/2002 |

* cited by examiner

*Primary Examiner*—Arti Singh-Pandey
(74) *Attorney, Agent, or Firm*—Erika S. Wilson

(57) ABSTRACT

Tubular structures formed of helically wound layers of a composite fabric structure. The fabric structure has an inwardly facing layer in the form of a fabric base. The fabric base comprises a network of high tenacity fibers. The composite fabric structure also includes an outwardly facing layer formed of rubber. The inwardly facing layer and the outwardly facing layer are bonded together, preferably through the use of a bonding layer. The tubular structure may be used as a stand along product, as an antichafing cover for a rope, as a liner for a pipe, or the like.

20 Claims, 1 Drawing Sheet

TUBULAR COMPOSITE STRUCTURES

BACKGROUND OF THE INVENTION

1. Field of the Invention

This invention relates to tubular composite structures which have high strength and abrasion resistance.

2. Description of the Related Art

Tubular structures such as pipes, hose and conduit are well known. Some of these structures are subject to heavy abrasion in use which decreases the wear life of the body. Other tubular structures lack the strength to be used in extreme conditions. In addition, it is desirable to provide tubular structures that are resistant to hostile chemicals that may flow therein.

It would be desirable to provide tubular structures which have high strength, are resistant to abrasion and are not affected by a variety of chemicals. Preferably such tubular structures should be flexible.

SUMMARY OF THE INVENTION

In accordance with this invention, there is provided a tubular structure comprising helically wound layers of a composite fabric structure, the fabric structure comprising an inwardly facing layer comprising a fabric base, the fabric base comprising a network of high tenacity fibers, and an outwardly facing layer comprising rubber, the inwardly facing layer and the outwardly facing layer being bonded together, and the layers of the composite structure being helically wrapped about each other.

The tubular structure may also comprise a bonding layer that is bonded to the fabric base and to the rubber layer.

Further in accordance with this invention, there is provided a rope protective covering structure which is resistant to chafing, the structure comprising a rope material and an antichafing structure covering the rope, the antichafing structure comprising a tubular structure comprising helically wound layers of a composite fabric structure, the fabric structure comprising an inwardly facing layer comprising a fabric base, the fabric base comprising a network of high tenacity fibers, and an outwardly facing layer comprising rubber, the inwardly facing layer and the outwardly facing layer being bonded together, the layers of the composite structure being helically wrapped about each other.

Also in accordance with this invention, there is provided a lined pipe construction comprising a hollow pipe and an inner lining for the pipe, the inner lining comprising a tubular structure comprising helically wound layers of a composite fabric structure, the fabric structure comprising an inwardly facing layer comprising a fabric base, the fabric base comprising a network of high tenacity fibers, and an outwardly facing layer comprising rubber, the inwardly facing layer and the outwardly facing layer being bonded together, and the layers of said composite structure being helically wrapped about each other.

The present invention provides a flexible tubular structure that is formed from a composite material. The composite material includes a strong fiber containing layer and an abrasion resistant rubber layer. The composite material is helically wrapped into a tubular shape. The tubular shape can be used by itself as a pipe or conduit. Alternatively, it can be used as an antichafing cover for ropes and the like. Furthermore, the tubular shape can be used as an inner lining for a pipe structure.

The tubular structures of this invention can be engineered to provide a variety of properties, such as excellent strength, abrasion resistance and/or chemical resistance. Specific properties are dependent on the type of fiber and rubber selected for the specific end use. Preferably the tubular structure is flexible. The tubular structures of this invention are relatively easy to manufacture.

BRIEF DESCRIPTION OF THE DRAWINGS

This invention will become more fully understood and further advantages will become apparent when reference is had to the following detailed description of the preferred embodiments of the invention and the accompanying drawings, in which.

DETAILED DESCRIPTION OF THE INVENTION

Figure 1:
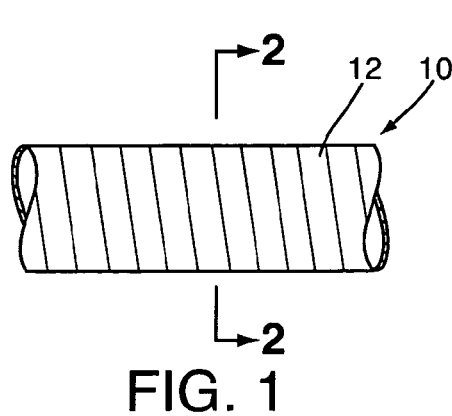
FIG. 1 is a perspective view of a tubular structure of this invention.

The present invention comprises tubular structures which include at least one layer of a composite fabric structure. The fabric structure comprises a fabric base which is formed from a network of high tenacity fibers.

For purposes of the present invention, a fiber is an elongate body the length dimension of which is much greater that the transverse dimensions of width and thickness. Accordingly, the term "fiber" includes monofilament, multifilament, ribbon, strip, staple and other forms of chopped, cut or discontinuous fiber and the like having regular or irregular cross-sections. The term "fiber" includes a plurality of any of the foregoing or a combination thereof. A yarn is a continuous strand comprised of many fibers or filaments.

As used herein, the term "high tenacity fibers" means fibers which have tenacities equal to or greater than about 7 g/d. Preferably, these fibers have initial tensile moduli of at least about 150 g/d and energies-to-break of at least about 8 J/g as measured by ASTM D2256. As used herein, the terms "initial tensile modulus", "tensile modulus" and "modulus" mean the modulus of elasticity as measured by ASTM 2256 for a yarn and by ASTM D638 for an elastomer or matrix material.

Preferably, the high tenacity fibers have tenacities equal to or greater than about 10 g/d, more preferably equal to or greater than about 15 g/d, even more preferably equal to or greater than about 20 g/d, and most preferably equal to or greater than about 25 g/d.

The network of fibers used in the composite fabric structure of the present invention may be in the form of woven, knitted or non-woven fabrics formed from high tenacity fibers. Preferably, at least 25% by weight of the fibers in the fabric are high tenacity fibers, more preferably at least about 50% by weight of the fibers in the fabric are high tenacity fibers, and still more preferably at least about 75% by weight of the fibers in the fabric are high tenacity fibers. Most preferably all of the fibers in the fabric are high tenacity fibers.

The yarns and fabrics of the invention may be comprised of one or more different high strength fibers. The yarns may be in essentially parallel alignment, or the yarns may be twisted, over-wrapped or entangled. The fabrics of the invention may be woven with yarns having different fibers in the warp and weft directions, or in other directions.

The cross-sections of fibers useful herein may vary widely. They may be circular, flat or oblong in cross-section. They may also be of irregular or regular multi-lobal cross-section having one or more regular or irregular lobes projecting from the linear or longitudinal axis of the fibers. It is preferred that the fibers be of substantially circular, flat or oblong cross-section, most preferably substantially circular.

High tenacity fibers useful in the yarns and fabrics of the invention include highly oriented high molecular weight polyolefin fibers, particularly high modulus polyethylene fibers, aramid fibers, polybenzazole fibers such as polybenzoxazole (PBO) and polybenzothiazole (PBT), polyvinyl alcohol fibers, polyacrylonitrile fibers, liquid crystal copolyester fibers, basalt or other mineral fibers, as well as rigid rod polymer fibers, and mixtures and blends thereof. Preferred high strength fibers useful in this invention include polyolefin fibers, aramid fibers and polybenzazole fibers, and mixtures and blends thereof. Most preferred are high modulus polyethylene fibers, aramid fibers and polybenzoxazole fibers, and blends and mixtures thereof. The yarns may comprise a single type of fiber or blends of two or more fibers. Additionally, different fibers may be employed in the fiber network.

U.S. Pat. No. 4,457,985 generally discusses such high molecular weight polyethylene and polypropylene fibers, and the disclosure of this patent is hereby incorporated by reference to the extent that it is not inconsistent herewith. In the case of polyethylene, suitable fibers are those of weight average molecular weight of at least about 150,000, preferably at least about one million and more preferably between about two million and about five million. Such high molecular weight polyethylene fibers may be spun in solution (see U.S. Pat. No. 4,137,394 and U.S. Pat. No. 4,356,138), or a filament spun from a solution to form a gel structure (see U.S. Pat. No. 4,413,110, German Off. No. 3,004, 699 and GB Patent No. 2051667), or the polyethylene fibers may be produced by a rolling and drawing process (see U.S. Pat. No. 5,702,657). As used herein, the term polyethylene means a predominantly linear polyethylene material that may contain minor amounts of chain branching or comonomers not exceeding about 5 modifying units per 100 main chain carbon atoms, and that may also contain admixed therewith not more than about 50 wt % of one or more polymeric additives such as alkene-1-polymers, in particular low density polyethylene, polypropylene or polybutylene, copolymers containing mono-olefins as primary monomers, oxidized polyolefins, graft polyolefin copolymers and polyoxymethylenes, or low molecular weight additives such as antioxidants, lubricants, ultraviolet screening agents, colorants and the like which are commonly incorporated.

High tenacity polyethylene fibers (also referred to as extended chain or high modulus polyethylene fibers) are preferred and are sold under the trademark SPECTRA® by Honeywell International Inc. of Morristown, N.J., U.S.A.

Depending upon the formation technique, the draw ratio and temperatures, and other conditions, a variety of properties can be imparted to these fibers. The tenacity of the fibers are at least about 7 g/d, preferably at least about 15 g/d, more preferably at least about 20 g/d, and most preferably at least about 25 g/d. Similarly, the initial tensile modulus of the fibers, as measured by an Instron tensile testing machine, is preferably at least about 300 g/d, more preferably at least about 500 g/d, still more preferably at least about 1,000 g/d and most preferably at least about 1,200 g/d. These highest values for initial tensile modulus and tenacity are generally obtainable only by employing solution grown or gel spinning processes. Many of the filaments have melting points higher than the melting point of the polymer from which they were formed. Thus, for example, high molecular weight polyethylene of about 150,000, about one million and about two million molecular weight generally have melting points in the bulk of 138° C. The highly oriented polyethylene filaments made of these materials have melting points of from about 7° C. to about 13° C. higher. Thus, a slight increase in melting point reflects the crystalline perfection and higher crystalline orientation of the filaments as compared to the bulk polymer.

Similarly, highly oriented high molecular weight polypropylene fibers of weight average molecular weight at least about 200,000, preferably at least about one million and more preferably at least about two million may be used. Such extended chain polypropylene may be formed into reasonably well oriented filaments by the techniques prescribed in the various references referred to above, and especially by the technique of U.S. Pat. No. 4,413,110. Since polypropylene is a much less crystalline material than polyethylene and contains pendant methyl groups, tenacity values achievable with polypropylene are generally substantially lower than the corresponding values for polyethylene. Accordingly, a suitable tenacity is preferably at least about 8 g/d, more preferably at least about 11 g/d. The initial tensile modulus for polypropylene is preferably at least about 160 g/d, more preferably at least about 200 g/d. The melting point of the polypropylene is generally raised several degrees by the orientation process, such that the polypropylene filament preferably has a main melting point of at least 168° C., more preferably at least 170° C. The particularly preferred ranges for the above described parameters can advantageously provide improved performance in the final article. Employing fibers having a weight average molecular weight of at least about 200,000 coupled with the preferred ranges for the above-described parameters (modulus and tenacity) can provide advantageously improved performance in the final article.

In the case of aramid fibers, suitable fibers formed from aromatic polyamides are described in U.S. Pat. No. 3,671, 542, which is incorporated herein by reference to the extent not inconsistent herewith. Preferred aramid fibers will have a tenacity of at least about 20 g/d, an initial tensile modulus of at least about 400 g/d and an energy-to-break at least about 8 J/g, and particularly preferred aramid fibers will have a tenacity of at least about 20 g/d and an energy-to-break of at least about 20 J/g. Most preferred aramid fibers will have a tenacity of at least about 20 g/d, a modulus of at least about 900 g/d and an energy-to-break of at least about 30 J/g. For example, poly(p-phenylene terephthalamide) filaments which have moderately high moduli and tenacity values are particularly useful in forming ballistic resistant composites. Examples are Kevlar® 29 which has 500 g/d and 22 g/d and Kevlar® 49 which has 1000 g/d and 22 g/d as values of initial tensile modulus and tenacity, respectively. Examples are Twaron® T2000 from Teijin which has a denier of 1000. Other examples are Kevlar® 29 which has 500 g/d and 22 g/d as values of initial tensile modulus and tenacity, respectively, as well as Kevlar® 129 and KM2 which are available in 400, 640 and 840 deniers from du Pont. Aramid fibers from other manufacturers can also be used in this invention. Copolymers of poly(p-phenylene terephthalamide) may also be used, such as co-poly(p-phenylene terephthalamide 3,4' oxydiphenylene terephthalamide). Also useful in the practice of this invention are poly(m-phenylene isophthalamide) fibers sold by du Pont under the trade name Nomex®.

High molecular weight polyvinyl alcohol (PV-OH) fibers having high tensile modulus are described in U.S. Pat. No. 4,440,711 to Kwon et al., which is hereby incorporated by reference to the extent it is not inconsistent herewith. High molecular weight PV-OH fibers should have a weight average molecular weight of at least about 200,000. Particularly useful PV-OH fibers should have a modulus of at least about 300 g/d, a tenacity preferably at least about 10 g/d, more preferably at least about 14 g/d and most preferably at least about 17 g/d, and an energy to break of at least about 8 J/g. PV-OH fiber having such properties can be produced, for example, by the process disclosed in U.S. Pat. No. 4,599,267.

In the case of polyacrylonitrile (PAN), the PAN fiber should have a weight average molecular weight of at least about 400,000. Particularly useful PAN fiber should have a tenacity of preferably at least about 10 g/d and an energy to break of at least about 8 J/g. PAN fiber having a molecular weight of at least about 400,000, a tenacity of at least about 15 to 20 g/d and an energy to break of at least about 8 J/g is most useful; and such fibers are disclosed, for example, in U.S. Pat. No. 4,535,027.

Suitable liquid crystal copolyester fibers for the practice of this invention are disclosed, for example, in U.S. Pat. Nos. 3,975,487; 4,118,372 and 4,161,470. Examples are Vectran® fibers from Kuraray.

Preferably the fibers are selected from the group consisting of high modulus polyethylene, aramid, polybenzazole, liquid crystal copolyester, and blends thereof.

Suitable polybenzazole fibers for the practice of this invention are disclosed, for example, in U.S. Pat. Nos. 5,286,833, 5,296,185, 5,356,584, 5,534,205 and 6,040,050. Polybenzazole fibers are available under the designation Zylon® fibers from Toyobo Co.

Rigid rod fibers are disclosed, for example, in U.S. Pat. Nos. 5,674,969, 5,939,553, 5,945,537 and 6,040,478. Such fibers are available under the designation M5® fibers from Magellan Systems International.

The high strength fibers may be in the form of a woven, knitted or non-woven fabric. Woven fabrics of any weave pattern may be employed, such as plain weave, basket weave, twill, satin, three dimensional woven fabrics, and any of their several variations. Plain weave fabrics are preferred and more preferred are plain weave fabrics having an equal warp and weft count.

One preferred material is a woven fabric formed from SPECTRA® polyethylene fibers. In one embodiment, the fabric preferably has between about 15 and about 45 ends per inch (about 5.9 to about 17.7 ends per cm) in both the warp and fill directions, and more preferably between about 17 and about 33 ends per inch (about 6.7 to about 13 ends per cm). The yarns are preferably each between about 650 and about 1200 denier. The result is a woven fabric weighing preferably between about 2 and about 15 ounces per square yard (about 67.8 to about 508.6 g/m$^2$), and more preferably between about 5 and about 11 ounces per square yard (about 169.5 to about 373.0 g/m$^2$). The following table provides fabric constructions that are suitable for use in the present invention. As those skilled in the art will appreciate, the fabric constructions described here are exemplary only and not intended to limit the invention thereto. Each of these uncoated fabrics is available from Hexcel of Anderson, S.C., and is made from SPECTRA® fiber:

| Style | Weave | Weight (Oz/Yd$^2$) | Thickness (Inches) | Counts (Ends/Inch) | Yarn Denier (Warp/Fill) |
|---|---|---|---|---|---|
| 902 | Plain | 5.5 | 0.018 | 17 × 17 | 1200/1200 |
| 904 | Plain | 6.3 | 0.017 | 34 × 34 | 650/650 |
| 952 | Plain | 6.0 | 0.017 | 34 × 34 | 650/650 |

As shown in the table, a plain weave fabric having 17 ends per inch of 1200 denier SPECTRA® 900 fiber in both the warp and fill directions weighs only about 5.5 ounces per square yard (about 186.5 g/m$^2$), but has a breaking strength of greater than 800 pounds force per inch (1401 N/cm) in both directions. Other weaves than a plain weave may be employed, such as a basket weave.

As mentioned above, the fabric may also be in the form of a knitted fabric. Knit structures are constructions composed of intermeshing loops, with the four major types being tricot, raschel, net and oriented structures. Due to the nature of the loop structure, knits of the first three categories are not as suitable as they do not take full advantage of the strength of a fiber. Oriented knitted structures, however, use straight inlaid yarns held in place by fine denier knitted stitches. The yarns are absolutely straight without the crimp effect found in woven fabrics due to the interlacing effect on the yarns. These laid in yarns can be oriented in a monoaxial, biaxial or multiaxial direction depending on the engineered requirements. It is preferred that the specific knit equipment used in laying in the load bearing yarns is such that the yarns are not pierced through.

Alternatively, the high strength fabric may be in the form of a non-woven fabric, such as plies of unidirectionally oriented fibers, or fibers which are felted in a random orientation, which are embedded in a suitable resin matrix, as is known in the art. Fabrics formed from unidirectionally oriented fibers typically have one layer of fibers which extend in one direction and a second layer of fibers which extend in a direction 90° from the first fibers. Where the individual plies are unidirectionally oriented fibers, the successive plies are preferably rotated relative to one another, for example at angles of 0°/90° or 0°/45°/90°/45°/0° or at other angles.

The resin matrix for the unidirectionally oriented fiber plies may be formed from a wide variety of elastomeric materials having appropriately low modulus. Preferably, the elastomeric materials used in such matrix possess initial tensile modulus (modulus of elasticity) equal to or less than about 6,000 psi (41.4 MPa) as measured by ASTM D638. More preferably, the elastomer has initial tensile modulus equal to or less than about 2,400 psi (16.5 MPa). Most preferably, the elastomeric material has initial tensile modulus equal to or less than about 1,200 psi (8.23 MPa).

The yarns of the fiber networks useful in the invention may be from about 50 denier to about 3000 denier, preferably from about 200 denier to about 3000 denier and more preferably from about 650 denier to about 1500 denier. Most preferably, the yarns are from about 800 denier to about 1300 denier.

The elastomeric material preferably forms about 1 to about 98 percent by weight, more preferably from about 10 to about 95 percent by weight, of the non-woven fabric. Preferably the resin matrix is flexible which provides a flexible non-woven fabric.

A wide variety of elastomeric materials may be utilized as the resin matrix. For example, any of the following materials may be employed: polybutadiene, polyisoprene, natural rubber, ethylene-propylene copolymers, ethylene-propylene-diene terpolymers, polysulfide polymers, polyurethane elastomers, chlorosulfonated polyethylene, polychloroprene, plasticized polyvinylchloride using dioctyl phthalate or other plasticizers well known in the art, butadiene acrylonitrile elastomers, poly(isobutylene-co-isoprene), polyacrylates, polyesters, polyethers, fluoroelastomers, silicone elastomers, thermoplastic elastomers, and copolymers of ethylene.

Preferred for polyethylene fabrics are block copolymers of conjugated dienes and vinyl aromatic copolymers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type $R-(BA)_x$ (x=3-150); wherein A is a block from a polyvinyl aromatic monomer and B is a block from a conjugated diene elastomer.

The elastomeric material may be compounded with fillers such as carbon black, silica, etc and may be extended with oils and vulcanized by sulfur, peroxide, metal oxide or radiation cure systems using methods well known to rubber technologists. Blends of different elastomeric materials may be used together or one or more elastomers may be blended with one or more thermoplastics.

As mentioned above, preferably there is a bonding layer which bonds the fabric base to the rubber layer.

Preferably the bonding layer is a thermoplastic material, but thermosetting materials such as epoxies or polyurethanes can also be employed. Preferred thermoplastic bonding materials for the bonding layer are films of olefin polymers or copolymers having a melting point or melting point range less than about 140° C., particularly ethylene polymers and copolymers (e.g., ethylene/propylene copolymers). Melting point is determined, for example, by differential scanning calorimetry (DSC) at a heating rate of 10° C. per minute. The most preferred bonding materials are low density polyethylene (LDPE), ethylene vinyl acetate (EVA) and LDPE/EVA copolymers. The bonding layer can be applied in any suitable form, although a film is particularly preferred. The film can be used to coat and bond to the high performance fabric base described hereinabove, while creating the intermediate bonding layer. EVA bonds particularly well to fabric woven from yarns containing high-strength, high molecular weight polyethylene fibers. The EVA layer acts as a highly satisfactory intermediate bonding layer that has a bonding affinity for both the inner fabric base layer and the outer layer of a rubber compound. While a thickness of up to about 40 mils (about 1 mm) is possible, preferably a thermoplastic film laminate of between about 4 and about 15 mils (about 0.1 to about 0.38 mm) thickness on each side of the fabric provides the most suitable flexible sheet construction. In particular, it has been found that a film thickness on each side of between about 4 mils (0.1 mm) and about 10 mils (0.25 mm) is most desirable when the EVA is used as an intermediate bonding layer. Polyethylene and ethylene vinyl acetate films each weigh about one ounce per mil of thickness per square yard. Thus, a 4 mil laminate on both sides of the fabric sheet adds only about 8 ounces (4 ounces on each side) to the total weight per square yard (about 271 g/m$^2$).

The rubber compound which is attached to the high tenacity fabric base may comprise natural rubber, synthetic rubber, nitrile rubber, and the like, and blends or mixtures of such rubbers. Preferably the rubber compound is selected from the group consisting of natural rubber and styrene butadiene; natural rubber and polybutadiene; and natural rubber, styrene butadiene and polybutadiene. The following table summarizes some of the exemplary compounds useful in the constructions of this invention. Each of these formulations is available from Specialty Tires of America of Indiana, Pa.

| Formulation | Natural Rubber | Styrene Butadiene | Polybutadiene |
|---|---|---|---|
| 2148 | 80% | 20% | 0% |
| 2160 | 66% | 14% | 20% |
| 2141 | 75% | 0% | 25% |
| 2170 | 25% | 35% | 40% |

These rubber compound formulations are obtained as uncured (B-Stage) raw compounds. Once cured, the resulting rubber is relatively hard but is still substantially thin and flexible. The rubber sheet is preferably between about 5 and about 50 mils (about 0.13 to about 1.27 mm) thick, more preferably between about 15 and about 40 mils (about 0.38 to 1 mm) thick, and most preferably about 30 mils (0.76 mm) thick. A release paper may be used to maintain the consistent application (thickness) of the uncured rubber sheet to the coated high strength fabric.

The fabric base layers may be formed in any suitable manner. For example, the thermoplastic film if employed may first be attached to the fabric in accordance with the teachings of U.S. Pat. No. 6,280,546. The final sheet-forming process may be conducted using a three-step process. The first step includes the tacking of the fabric (with coating, if desired, such as an EVA-coated fabric) to a raw rubber compound sheet, with the coated fabric and the rubber sheet being supplied from rolls on a continuous basis. A calendar roll may be used to press the two sheets together to form a lightly covered sheet. As those skilled in the art will appreciate, the process is easily modified where the rubber sheet is desired on both sides of the sheet material.

A suitable machine for tacking the rubber compound sheet to the coated fabric is the Van Vlandrin Silk Calender with a husk soft roll and a steel center roll. Unlike some calendering processes, there is little or no heat applied during the tacking step, to avoid premature curing of the rubber sheet. Once the coated fabric is initially adhered to the rubber sheet, it can be separated therefrom easily until heated and cured. Because the rubber sheet is uncured, i.e., "tacky", the underlying coated fabric inner layer is important in providing support and underlying structure for the uncured rubber sheet.

One or more composite fabric structure layers may be employed in the tubular structures of this invention. The multiple layer structure may be made of the same or different individual composite layers.

Examples of composite fabric structures useful in this invention are disclosed, for example, in U.S. patent application Ser. No. 11/037,680, filed Jan. 18, 2005, the disclosure of which is expressly incorporated herein by reference to the extent not inconsistent herewith.

To form the helically wrapped tubular structures of the invention, preferably the composite fabric structure is in the form of a narrow width fabric structure that may be cut from wider structures. By narrow width is meant that the fabric structure has a width of from about 1 to about 20 inches (2.54 to 50.8 cm), more preferably from about 2 to about 16 inches (5.08 to 40.64 cm), and most preferably from about 4 to about 16 inches (10.16 to 40.64 cm). Smaller diameter tubular structures are generally formed from narrower fabric composites.

The narrow width strips of the composite fabric structures are helically wound onto a mandrel and then cured under suitable heat and, preferably, pressure. For example, the fabric on the mandrel may be heat for between about 2 to about 24 hours at a temperature of from about 220 to 280° F. (about 104 to 138° C.), more preferably for between about 4 to about 8 hours at a temperature of from about 220 to about 240° F.

(about 104 to about 116° C.). The pressure may range from about 100 to about 150 psi (about 689 to about 1033.5 kPa). The resultant flexible hose is then removed from the mandrel.

When winding the fabric structure over the mandrel, each successive layer may, for example, overlap the previous layer by a desired amount, such as from about 15 to about 75% of the width of the previous layer, more preferably about one-half of the width of the previous layer. It should be understood that other overlapping distances (or no overlap) may be employed. When helically winding the composite fabric, a winding angle of from about 40 to about 60 degrees is preferred. To achieve the maximum burst strength of the tubular structure the winding angle should be about 57 degrees.

To achieve further strength in the tubular structure, the composite fabric may initially be wound on the mandrel in one direction, and then overlapped by winding the composite fabric in the opposite direction.

The resultant tubular structure may be used by itself as a pipe, hose or conduit or the like. These structures are preferably flexible. They may be employed in a variety of applications, such as for high or low pressure gas transmission, transmission of corrosive chemicals, oil and other petroleum products, water, waste products, and the like. When the fabric is formed from high modulus weight polyethylene, for example, the fabric is particularly resistant to a variety of chemicals.

Another use for the tubular structures of this invention is as antichafing covers for ropes (including mooring lines, etc.). The relatively low coefficient of friction of the materials in the fabric base allow for ease of movement of the rope inside of the protective cover. The rubber layer provides a high level of abrasion resistance to the product. Such antichafing covers would extend the wear life of products such as tug or mooring lines. Such covers are preferably not adhered to the ropes so that the ropes can freely move therein.

An additional use for the tubular structures of the invention is as a liner for existing pipe or hose. Such pipe may be formed of metal, plastic or composite. The chemical resistance of the fibrous networks again permits the transmission of chemicals, including corrosive chemicals, through the pipe structure and minimizes any damage to the existing pipe or hose.

A pipe structure which includes a covering (as opposed to a liner) of high tenacity polyolefin fibers is disclosed in copending U.S. patent application Ser. No. 11/228,935, filed Sep. 16, 2005, the disclosure of which is expressly incorporated herein by reference to the extent not inconsistent herewith.

The tubular structures of this invention may include additional layers of its components. For example, multiple fibrous network layers may be employed. Also, if desired a second fibrous network layer may be positioned over the rubber layer, and a second bonding layer may be employed between the second fibrous layer and the rubber layer. The resulting structure has five layers (fibrous layer/bonding layer/rubber layer/bonding layer/fibrous layer). Alternatively, another rubber layer may be attached to the inner fibrous layer and another bonding layer may connect the inner fibrous layer with the second rubber layer. This resulting structure also has five layers (rubber layer/bonding layer/fibrous layer/bonding layer/rubber layer). Additional layers may also be employed, depending on the desired application.

Figure 2:
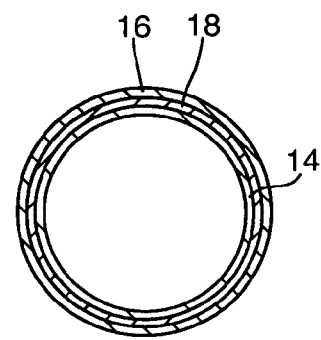
FIG. 2 is a cross-sectional view (not to scale) of the tubular structure along lines 2-2 of FIG. 1.

With reference to the drawings, there is shown in FIG. 1 a tubular structure 10 which is formed of helical windings 12 of a narrow width composite fabric. As shown in FIG. 2, tubular structure is formed from an inner fibrous layer 14, an outer rubber layer 16 and an intermediate bonding layer 18 (if desired).

Figure 3:
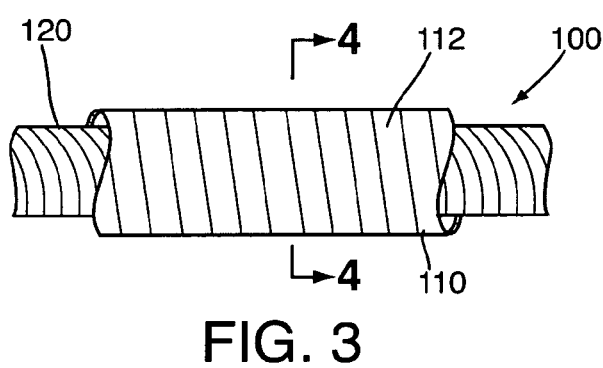
FIG. 3 is a perspective view of a rope structure of this invention.
Figure 4:
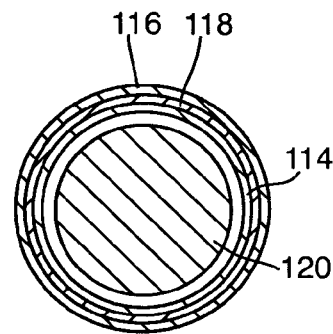
FIG. 4 is a cross-sectional view (not to scale) of the rope structure along lines 4-4 of FIG. 3.

An antichafing rope structure is shown in FIG. 3. Rope structure 100 is formed from a rope 120 and a cover 110 formed of helical windings 112 of a narrow width fabric. As shown in FIG. 4, rope 120 is positioned interiorly of cover 110. Cover 110 includes an interior facing fibrous layer 114, an outer rubber layer 116 and an intermediate bonding layer 118 (if desired). In this construction, rope 120 is free to move within cover 110.

Figure 5:
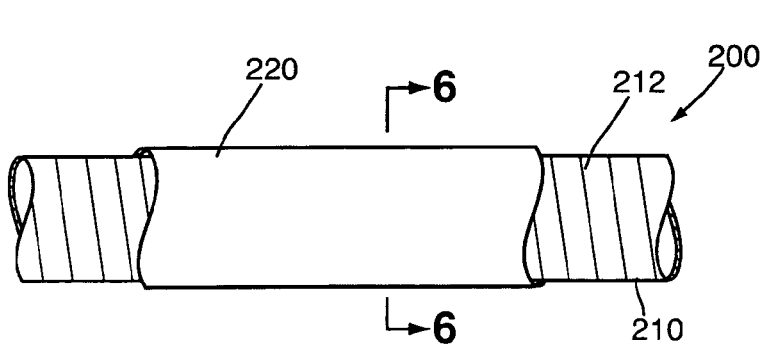
FIG. 5 is a perspective view of a lined pipe construction of this invention.
Figure 6:
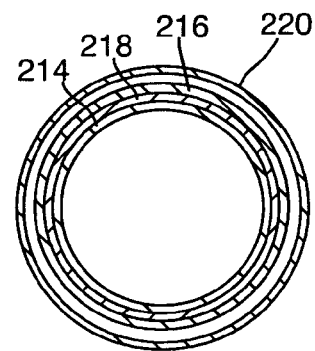
FIG. 6 is a cross-sectional view (not to scale) of the lined pipe construction along lines 6-6 of FIG. 5.

A lined pipe construction is shown in FIG. 5. Pipe construction 200 is formed from a hollow pipe 220 having a liner 210 in the interior thereof. Liner 210 is formed of helical windings 212 of a narrow width fabric. Liner 210 includes an interior facing fibrous layer 214, an outer rubber layer 216 and an intermediate bonding layer 218 (if desired).

The following non-limiting examples are presented to provide a more complete understanding of the invention. The specific techniques, conditions, materials, proportions and reported data set forth to illustrate the principles of the invention are exemplary and should not be construed as limiting the scope of the invention.

EXAMPLES

Example 1

A tubular hose was formed from a woven fabric (style 904) of 650 denier polyethylene yarn, designated SPECTRA® 900 from Honeywell International Inc., having tensile properties of 28 g/d tenacity and 775 g/d modulus. The fabric was a 34×34 ends/inch (13.4×13.4 ends/cm) plain weave fabric having a thickness of 0.017 inch (0.43 mm).

A bonding layer film formed from an ethylene vinyl acetate polymer (EVA) film having a thickness of 0.003 inch (0.076 mm) was attached to one side of the fabric. The rubber compound layer was formed from a blend of 80% natural rubber and 20% of styrene butadiene (formulation 2148 from Specialty Tires) and was attached to the bonding layer.

A narrow width composite fabric having a width of 4.5 inches (11.43 cm) was cut from the roll. The fabric was helically wrapped over a cylindrical mandrel having an outer diameter of 2.25 inch (5.72 cm), with each layer overlapping the adjacent layer by about 0.75 inch (1.91 cm). The helical winding angle was 57 degrees. The composite fabric was subjected to heat and pressure of 220 to 240° F. (104 to 116° C.) and 100 to 150 psi (689 to 1033.5 kPa) and then removed from the mandrel. The resulting tubular structure had an inner diameter of 2.125 inch (5.398 cm), wall thickness of 0.19 inch (0.48 cm) and a weight of 1 pound per foot of hose (138.47 g/m).

The breaking strengths in the hoop direction was 726 lbf per inch (1271 N per cm) and in the axial direction was 942 lbf per inch (1650 N per cm). The burst pressure was 290 psi (2.0 MPa). Measurements were determined in accordance with ASTM D1599.

The stand alone tubular structure had excellent breaking strengths and burst pressures.

Example 2

Example 1 is repeated using as the fibrous layer Kevlar® 29 fabric from Du Pont.

Similar results are noted.

Example 3

Example 1 is repeated using as the fabric layer a unidirectionally oriented structure of high modulus polyethylene fibers.

Similar results are noted.

Example 4

Example 1 is repeated using as the fabric layer a fabric formed from PBO fibers.

Similar results are noted.

The present invention provides a tubular structure that has improved strength and abrasion resistance. The tubular structure may be used by itself as a hose or the like, or it may be used in combination with a rope as an antichafing cover, or as a liner for a pipe. Of course, the tubular structure may be employed in other applications.

Having thus described the invention in rather full detail, it will be understood that such detail need not be strictly adhered to but that further changes and modifications may suggest themselves to one skilled in the art, all falling within the scope of the invention as defined by the subjoined claims.

What is claimed is:

1. A tubular structure comprising helically wound layers of a preformed composite narrow width fabric structure, said fabric structure comprising an inwardly facing layer comprising a fabric base, said fabric base comprising a network of high tenacity fibers, and an outwardly facing layer comprising rubber, said inwardly facing layer and said outwardly facing layer being bonded together, and said layers of said composite structure being helically wrapped about each other such that a successive layer overlaps a previous layer by about 15% to about 75% of the width of said previous layer.

2. The tubular structure of claim 1 wherein said composite fabric structure further comprises a bonding layer between said inwardly facing layer and said outwardly facing layer and bonded to said inwardly facing layer and said outwardly facing layer.

3. The tubular structure of claim 1 wherein said high tenacity fibers have a tenacity of at least about 25 grams per denier.

4. The tubular structure of claim 1 wherein said high tenacity fibers are selected from the group consisting of high modulus polyethylene, aramid, polybenzazole, liquid crystal copolyester, and blends thereof.

5. The tubular structure of claim 1 wherein said high tenacity fibers comprise high modulus polyethylene fibers.

6. The tubular structure of claim 1 wherein said fabric base comprises a woven fabric.

7. The tubular structure of claim 1 wherein said rubber comprises a natural rubber.

8. The tubular structure of claim 1 wherein said rubber comprises a composition selected from the group consisting of natural rubber and styrene butadiene; natural rubber and polybutadiene; and natural rubber, styrene butadiene and polybutadiene.

9. The tubular structure of claim 1 wherein said fabric base comprises a non-woven fabric.

10. The tubular structure of claim 9 wherein said high tenacity fibers of said non-woven fabric extend unidirectionally with respect to each other.

11. The tubular structure of claim 1 wherein said layers of said composite structure are helically wrapped about each other at an angle of between about 40 and about 60 degrees.

12. The tubular structure of claim 2 wherein said bonding layer comprises a thermoplastic material.

13. The tubular structure of claim 12 wherein said fabric base comprises high molecular weight polyethylene fibers and said rubber comprises natural rubber.

14. The tubular structure of claim 13 wherein said bonding layer comprises ethylene vinyl acetate.

15. A tubular structure comprising helically wound layers of a preformed composite narrow width fabric structure, said fabric structure comprising an inwardly facing layer comprising a fabric base, said fabric base comprising a network of high tenacity high modulus polyethylene fibers, an outwardly facing layer comprising natural rubber, and a thermoplastic bonding layer between said inwardly facing layer and said outwardly facing layer and bonded to said inwardly facing layer and said outwardly facing layer, and said layers of said composite structure being helically wrapped about each other such that a successive layer overlaps a previous layer by about 15% to about 75% of the width of said previous layer.

16. The tubular structure of claim 15 wherein said rubber comprises a composition selected from the group consisting of natural rubber and styrene butadiene; natural rubber and polybutadiene; and natural rubber, styrene butadiene and polybutadiene.

17. The tubular structure of claim 16 wherein said thermoplastic bonding layer comprises ethylene vinyl acetate.

18. The tubular structure of claim 17 wherein said fabric structure comprises a woven fabric.

19. The tubular structure of claim 17 wherein said tubular structure consists of said helically wound layers of said composite fabric structure that are wrapped about each other and are bonded together under heat and pressure.

20. A tubular structure comprising helically wound layers of a preformed composite narrow width fabric structure, said fabric structure consisting of an inwardly facing layer comprising a woven fabric base, said fabric base comprising a network of high tenacity high modulus polyethylene fibers, an outwardly facing layer comprising natural rubber, and a thermoplastic bonding layer between said inwardly facing layer and said outwardly facing layer and bonded to said inwardly facing layer and said outwardly facing layer, and said layers of said composite structure being helically wrapped about each other such that a successive layer overlaps a previous layer by about 15% to about 75% of the width of said previous layer.

* * * * *